May 14, 1957 D. D. DEMAREST ET AL 2,791,797
FRANKFURTER SEVERING AND PEELING MECHANISM
Filed May 13, 1953 6 Sheets-Sheet 1

Fig. 1.

INVENTOR.
Daniel Douglas Demarest
Robert Merritt Perkins
William Karius and
Carl Berendt
BY Mason, Nolte, Crews & Berry
ATTORNEYS

Fig. 3

INVENTOR.
Daniel Douglas Demarest
Robert Merritt Perkins
William Karius and
Carl Berendt
BY Moses, Nolte, Crews + Berry
ATTORNEYS May 14, 1957 D. D. DEMAREST ET AL 2,791,797
FRANKFURTER SEVERING AND PEELING MECHANISM
Filed May 13, 1953 6 Sheets-Sheet 5

INVENTOR.
Daniel Douglas Demarest
Robert Merritt Perkins
William Karius
Carl Berendt
BY Mosco, Nolte, Crews & Berry
ATTORNEYS May 14, 1957 D. D. DEMAREST ET AL 2,791,797
FRANKFURTER SEVERING AND PEELING MECHANISM
Filed May 13, 1953 6 Sheets-Sheet 6

INVENTOR.
Daniel Douglas Demarest
Robert Merritt Perkins
William Karius and
Carl Berendt
BY
ATTORNEYS

United States Patent Office 2,791,797
Patented May 14, 1957

2,791,797

FRANKFURTER SEVERING AND PEELING MECHANISM

Daniel Douglas Demarest, Port Washington, N. Y., and Robert Merritt Perkins, Upper Montclair, William Karius, Union, and Carl Berendt, Millburn, N. J., assignors to Linker Machines, Inc., Newark, N. J., a corporation of New York Application May 13, 1953, Serial No. 354,812

8 Claims. (Cl. 17—1)

This invention relates to mechanism for severing from one another and peeling the links of a string of sausages, frankfurters or the like, the invention being concerned primarily with improvements upon the machine as disclosed in Patent No. 2,672,646, filed June 15, 1950, for Apparatus and Method for Removing Casings From Sausages and the Like.

In said prior machine, a string of frankfurters is advanced by feed rollers at constant speed to a device which, for brevity, has become known in the art as the ripperhead. The ripperhead comprises a lower jaw and a vertically movable upper jaw. The upper jaw rides the string and, when it moves downward between links, it initiates a cycle of operations of the ripperhead, in the course of which it is itself caused to clamp the ligature between the leading link and the second link. With the ligature thus clamped, the ripperhead advances with the string, severs the leading link from the string, and starts a tab forming tear in or near the ligature appendage at the leading end of the previously referred to second link. The ripperhead then releases the clamped ligature and returns relative to the string to its original position, in which it is free to act upon the next ligature.

In Patent No. 2,701,385, provision has been made of a slow descent catch for causing the upper jaw to be lowered gradually onto the frankfurter string, of means for preventing the initiation of a ripperhead cycle until the return stroke of the ripperhead is completed, and of means for preventing the initiation of the ripperhead cycle when the string runs out.

The advantages of all these features are realized in the present invention, in an improved and simplified way, together with other advantages which will be explained.

It is an object of the present invention to provide novel ripperhead control mechanism, so constructed and arranged that the upper jaw never rides the frankfurter string and therefore never interferes with the feeding of the frankfurters.

It is a further object to improve the timing of the ligature clamping, so that the upper jaw of the ripperhead may be caused to clamp the ligature immediately adjacent to the trailing end of the leading frankfurter. This is advantageous for the reason that every ligature is tied with a piece of string. By clamping the ligature in the manner stated, the severing knife can be caused to sever the ligature without severing the string. By leaving the string tied onto the severed ligature all danger of fouling the machine with loose pieces of string is avoided. The string is necessarily disposed of as an integral part of the frankfurter skin. The achievement of this result is the primary object of the invention.

These objects are achieved in the illustrative embodiment of the invention in the following manner. The initiation of a ripperhead cycle is controlled by a feeler which bears yieldingly upward against the frankfurter string at a point somewhat in advance of the normal or idle position of the ripperhead jaws. A spring latch is provided for holding the upper jaw off the frankfurter string altogether except when it is tripped by the feeler. The latch is carried by the lower ripperhead jaw and acts directly upon the upper ripperhead jaw to detain the latter in an elevated position. As the ripperhead returns to its normal position with the feeler bearing upward against the body of a frankfurter link, the latch engages and bodily shifts an actuating or trigger link, displacing it pivotally against the resistance of a compression coil spring, and holding it displaced. When the ligature between links comes opposite the feeler, the feeler is spring-urged upward and carries the trigger link upward with it into position to snap over the engaged adjacent portion of the latch. As the ligature passes on beyond the feeler, the feeler is again depressed, by the frankfurter, causing the trigger link to exert a downward pull on the latch which rocks the latch to a jaw releasing position. The operation is timed to cause the upper jaw to drop onto the ligature which has just passed the feeler and to initiate a cycle of ripperhead operations broadly as Patent No. 2,672,646.

Other objects and advantages will hereinafter appear.

In the drawing forming part of this specification:

Figures 3 to 11 are upon larger scales than Figures 1 and 2.

Figure 10:
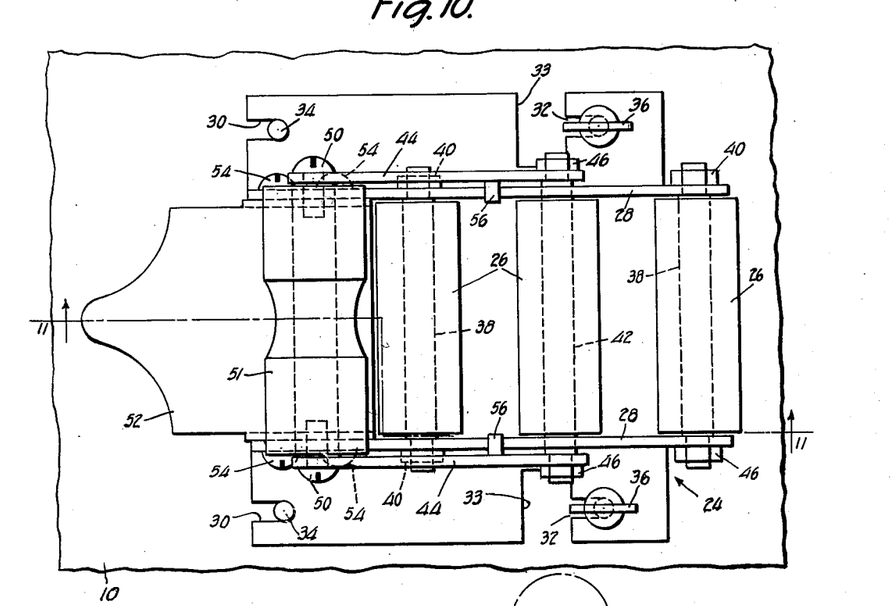
Figure 10 is a fragmentary plan view showing the introductory end of the machine.
Figure 11:
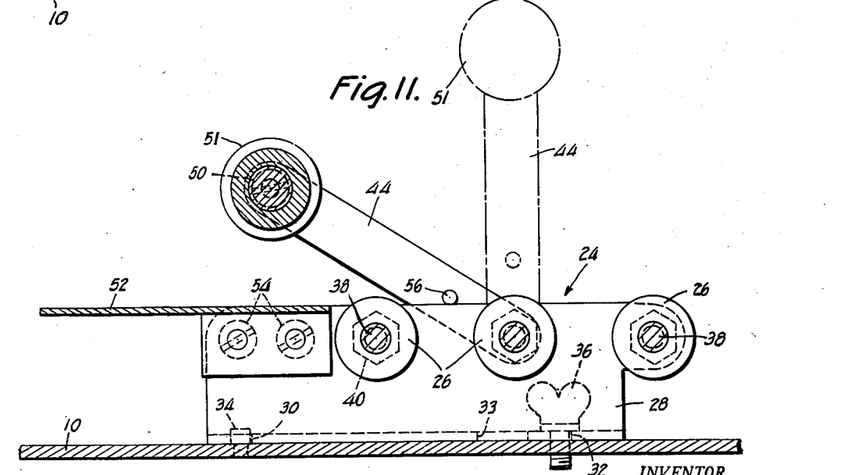
Figure 11 is a vertical sectional view taken upon the line 11—11 of Figure 10, looking in the direction of the arrows.

The illustrative machine comprises a stationary base plate or table 10 which is supported at a convenient height above the floor by suitable frame members, not shown. The string of frankfurters or sausages 14 is introduced into the machine over a roller 16 (Fig. 2) which is supported from the table 10 in open bearings 18. The frankfurter string passes thence between feed rollers 20 and 22 and onto a roller table 24 which comprises a series of rollers 26 and supporting brackets 28 (see Figs. 2, 10 and 11). Each bracket 28 is in the form of an angle plate having a vertical bearing flange and a notched horizontal attaching flange. Each horizontal flange is formed with two open ended slots 30 and 32 which face in the direction of frankfurter feed. The open ends of the slots 32 communicate with large notches 33. Stationary pins 34 extend upward from table 10 and are received in the slots 30. The threaded shanks of thumb screws 36 are passed downward through the slots 32 and are threaded into the table. The thumb screws clamp the brackets 28 in place, and may be backed off slightly to release the brackets whenever it is desired to remove the brackets and the structure supported by the brackets from the machine, as for cleaning purposes. When the screws 36 have been freed and their thumb pieces have been set crosswise, and when the brackets 28 have been slid along to locate the screw heads within the bounds of the notches 33, the brackets 28 may be lifted out of the machine.

Figure 2:
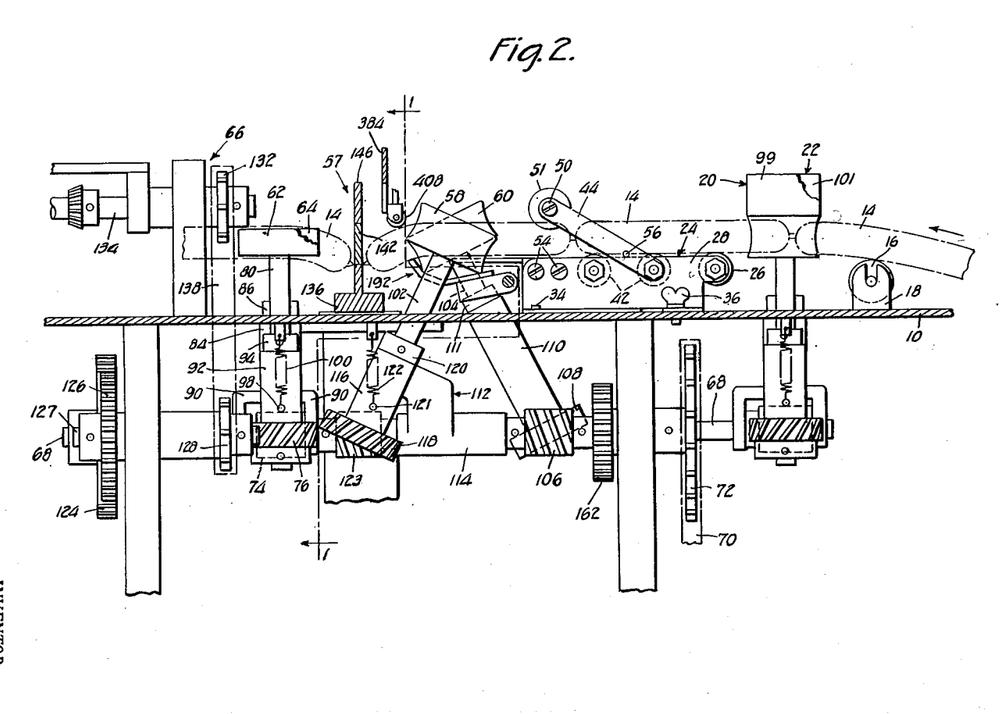
Figure 2 is a longitudinal vertical sectional view taken upon the line 2—2 of Figure 1, looking in the direction of the arrows.

As shown, the end rollers 26 are supported from the brackets 28 upon shouldered shafts 38 which are clamped to the brackets 28 by nuts 40. An intermediate roller 26 is supported from the brackets 28 upon an intermediate shaft 42 which extends freely through the brackets 28. The shaft 42 is also shouldered, however, and has the lower ends of arms 44 mounted upon its reduced end portions and held in place by nuts 46. The arms 44 support a hold-down roller 51 through bearing screws 50. A flanged plate 52, suitably connected to the brackets 28 as by screws 54, supports the frankfurters in opposition to the roller 51. The roller 50 is intended only as a hold-down roller and is not required to drop down into the spaces between successive links. Each arm 44 is provided with a stop pin 56 engageable with the upper edge of the associated bracket 28 for limiting descent of the roller 50. When a frankfurter of minimum thickness is traveling beneath the roller 50 the stop pins are barely lifted out of contact with the brackets 28. From the plate 52 the frankfurters are advanced at constant speed to the ripperhead 57 by opposed, oppositely inclined, concave feed rollers 58 and 60 (Fig. 2).

The construction and operation of the ripperhead involve the principal novelty of the invention, and will be described a little farther on.

At the ripperhead the leading frankfurter is severed from the remainder of the string 14 and from the point on each severed frankfurter is individually advanced by opposed feed rollers 62 and 64 to peeling mechanism 66. The rollers 62, 64 are driven at slightly higher speed than the rollers 20, 22 and the rollers 58, 60. The illustration of the peeling mechanism includes only a fragment of the drive of that mechanism, since the peeling mechanism forms no part of the present invention and its construction may desirably be as disclosed in Serial No. 168,324.

All of the mechanism referred to is driven from a main drive shaft 68 (Figs. 1 and 2) which extends longitudinally of the machine beneath the table 10, and which is itself driven from a motor (not shown) through a chain 70 and a sprocket 72 fast on the shaft 68.

The drives for the rollers 20, 22 and the rollers 62, 64 from shaft 68 are identical, save that the gear ratios are made to differ slightly, to cause the rollers 62, 64 to feed at a slightly faster rate than the rollers 20, 22. Since the drive for the rollers 62, 64 is the better illustrated of the two, this drive will be described.

A worm wheel 74, fast on the shaft 68, drives spiral gears 76 and 78 which are fast, respectively, upon vertical shafts 80 and 82, at whose upper ends the rollers 62 and 64 are, respectively, carried. A sleeve 84, unitary with the table 10, is interposed between the gear 78 and the lower face of the table 10. A collar 86, secured to the shaft 82 just above the table, holds the shaft 82 and the gear 78 upward, causing the gear to bear upward against the sleeve 84.

The sleeve bracket 88 includes arms 90 which are rockably supported on the shaft 68, and a vertical sleeve portion 92 which serves as a guide bearing and support for the shaft 80. A collar 94, fast on the shaft just above the sleeve portion 92, bears against the sleeve portion 92 in opposition to the gear 76, and secures the shaft against movement axially of the sleeve portion 92. The shaft 80 extends upward through an opening 96 in the table 10, which opening is larger than the shaft 80, at least in its transverse dimension, so that the shaft 80, together with the bracket 88, may be free to rock about the axis of the drive shaft 68. An arm 98, fast on the bracket 88, has its free end connected to the table 10 through a tension coil spring 100. The spring 100 tends to urge the shaft 80 toward the right into engagement with the right hand boundary of the opening 96 (as the parts are viewed in Fig. 1), but is free to yield to frankfurter pressure, so that it causes the frankfurter to be pressed yieldingly by the roller 62 against the roller 64.

The foregoing description of the drive for rollers 62, 64 is equally applicable to the drive for the rollers 20, 22, save that the gears 74, 76, 78 of the former drive produce a slightly higher output speed than the corresponding gears of the latter drive. The rollers 20, 22 have lower concave portions between which the frankfurters normally travel and upper cylindrical portions 99 and 101 of substantial height which serve to prevent escape of the frankfurters in an upward direction from between the rollers.

The rollers 58 and 60 (Fig. 2) are affixed to the upper ends of inclined shafts 102 and 104, the former being inclined upward and in the direction opposite to the direction of frankfurter feed, and the latter being inclined upward and in the direction of frankfurter feed. A worm gear 106 fast on shaft 68, drives a spiral gear 108 fast on the lower end of the inclined shaft 104. A sleeve 110, unitary with the table 10, surrounds the shaft 104 between the gear 106 and the upper end of the shaft. The sleeve 110 extends through the table. A collar 111, fixed on the shaft bears against the upper, inclined end of the sleeve 110 and holds the gear 108 up against the lower end of the sleeve.

The mounting of the shaft 102 is similar to that of the shaft 80. A sleeve bracket 112 comprises a horizontal sleeve portion 114 which is rockable on the shaft 68, and an inclined sleeve portion 116 which supports the shaft 102. The sleeve is confined relative to the shaft 102 by a spiral gear 118 at the lower end of the shaft, and a collar 120 which is fixed on the shaft just above the sleeve 116. The roller 58 is urged toward the roller 60 by a tension coil spring 122 which is connected at its upper end to the table 10 and at its lower end to an arm 121 on the bracket 112. The spiral gear 118 is driven by a gear 123 fast on shaft 68.

The shaft 68 also has fast upon it a gear 124 (Fig. 2) which drives a pair of gears 126 (one shown). The gears 126 are made fast upon horizontal shafts 127, and each shaft 127 has fast upon it a sprocket 128 through which it drives a chain 130. The illustrated chain 130 drives a sprocket 132, fast on an upper shaft 134 by which upper rollers of the mechanism 66 are driven. The other chain 130, which is not illustrated, drives a similar shaft by which lower rollers of the mechanism 66 are driven. The peeling mechanism 66 is fully disclosed in Patent No. 2,672,646.

The ripperhead 56 stands normally in a retracted position but is adapted when tripped to move forward with the frankfurters for a short distance and then to return and come to rest in its original position, being caused in the course of such movement to execute a prescribed cycle of operations. The ripperhead 56 comprises a lower jaw 136 (Fig. 1) which is attached at its end remote from the operator to the upper end of a vertical rock shaft 138, and which carries at its end near to the operator an upstanding guide 140. An upper jaw 142 is carried by the lower jaw 136, being supported for up and down movement upon a pivot pin 144. The jaw 142 is guided for vertical movement by the guide member 140.

The jaw 142 supports a slide bar 146, being provided with guides 148 and 150 which embrace the slide bar. The tail of the slide bar is connected through a link 152 with one arm of a bell crank lever 154. The bell crank lever 154 is supported from the jaw 136 through a pivot pin 156, and has its second arm connected through a pin and slot connection 157 to a rod 158 which extends vertically through shaft 138. The lower jaw 136 can be moved only horizontally about the axis of the shaft 138. The upper jaw 142 participates in the horizontal movement of the jaw 136 but is additionally rockable vertically about the axis of the pivot pin 144. The slide bar 146 participates in both movements of the jaw 142, and is also slidable in and out along jaw 142.

The shaft 138 and the rod 158 are actuated and controlled from a cam shaft 160. The cam shaft 160 is normally idle but is driven at times from the shaft 68 through a one revolution Hilliard clutch (not shown). A gear 162, (Fig. 2) fast on the shaft 68, and a meshing gear (not shown) constantly drives the input member of the clutch. A cam (not shown) fast on the shaft 160 drives the shaft 138 through an arm 164 on said shaft.

A track cam 166 fast on the shaft 160 drives the rod 158. The driving connection comprises a follower 168 which is carried by an arm 170 fast on a horizontal rock shaft 172. The rock shaft 172 also has fast upon it a lever 174. One arm of the lever 174 has pivotal connection with the lower end of the rod 158. The opposite arm of the lever 174 has an offset portion 176 which extends beneath an arm 178 of a clutch controlling bell crank lever 180 loose on the shaft 172. The other arm 182 of the bell crank 180 cooperates through a nose 181 with the single tooth of a clutch controlling disc 184 through which the rotation of the cam shaft is started and stopped.

Figure 1:
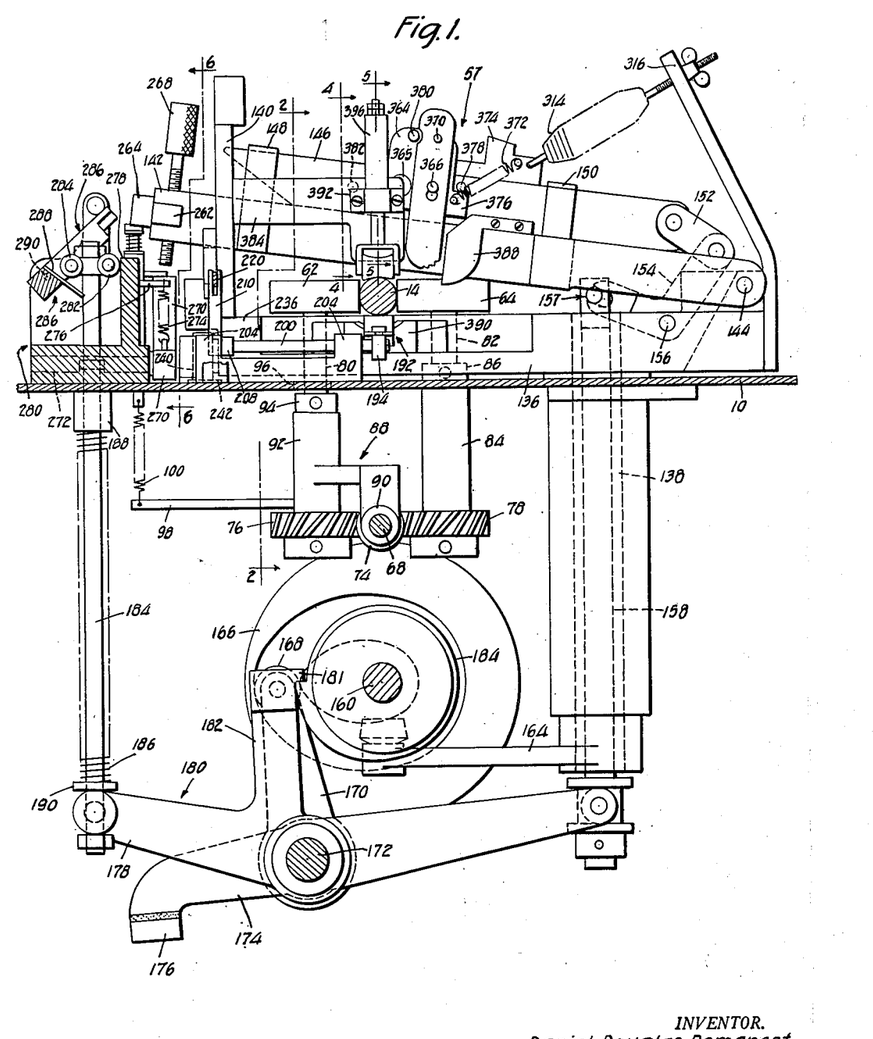
Figure 1 is a view in transverse sectional elevation of an illustrative machine which embodies the improvements of the invention, the section being taken substantially on the line 1—1 of Figure 2, looking from the introductory end toward the delivery end of the machine, as indicated by the arrows.

The arm 178 has pivotal connection with the lower end of a rod 184 through which the bell crank 180 is shifted to release the clutch. The rod 184 is constantly urged downward by a compression coil spring 186. The spring 186 is interposed between a boss 188 on the under side of the table 10 and a collar 190 on the lower end of the rod. The rod 184 is normally detained in a raised position as illustrated in Fig. 1, but is adapted to be tripped by mechanism to be described. When tripped the rod forces the bell crank 180 about the shaft 172 counterclockwise (Fig. 1), releasing the disc 184 and thereby rendering the clutch active to drive the shaft 160.

During the first half revolution of the shaft 160, the ripperhead is swung forward and the slide bar 146 is slid outward along the upper jaw 142. At the same time the projection 176 lifts the bell crank arm 178 to return the bell crank to the position in which it is illustrated in Fig. 1. This restores the rod 184 to its raised position. The rod 184 is detained in its raised position by mechanism to be described, with the result that the disc 184 is caused to be arrested by the nose 181 upon the completion of one revolution of the cam shaft. During the second half revolution of the cam shaft 160 the arm 164 and the lever 174 are returned to their original positions, the result being that the ripperhead as a whole is restored to normal position and the slide bar 146 is returned to the position relative to the upper jaw 142 in which it is shown in Fig. 1.

A salient feature of the invention has to do with the novel mechanism for controlling the tripping of the clutch and the consequent initiation of a ripperhead cycle. Heretofore the upper ripperhead jaw 142 has ridden the frankfurter string and has acted when it dropped into the space between successsive frankfurters to actuate a tripper or trigger mechanism. In the present machine the upper ripperhead jaw 142 is normally held out of engagement with the frankfurter string 14 and is made responsive to a feeler 192 which bears upward against the frankfurter string.

The upper jaw 142 is not allowed to descend until the feeler 192 has moved up into the space between successive frankfurters and has been again depressed by the leading end of the frankfurter which follows that space. When this has occurred, the upper jaw 142 descends and is instrumental in initiating a ripperhead cycle of the kind described in Patent No. 2,701,385.

Figure 3:
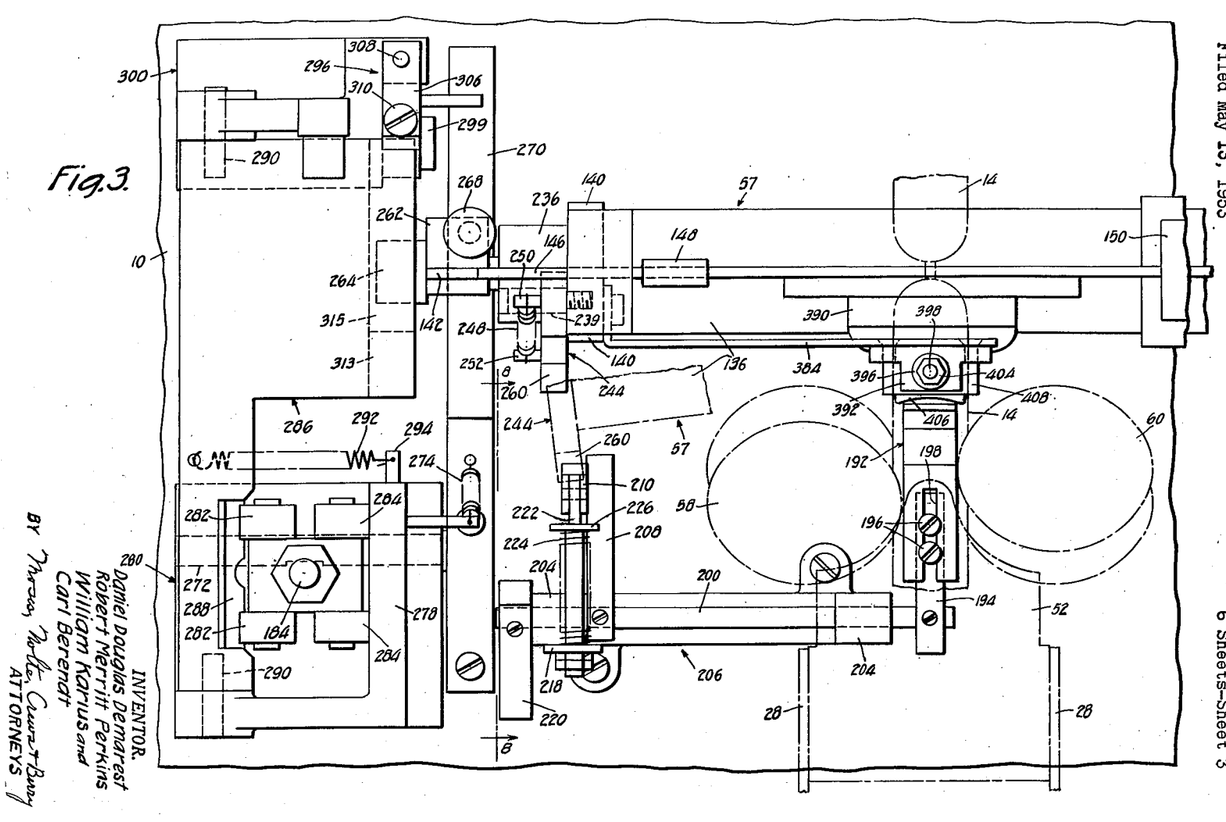
Figure 3 is a fragmentary plan view showing portions of the ripperhead and associated mechanism.
Figures 7, 8, 9:
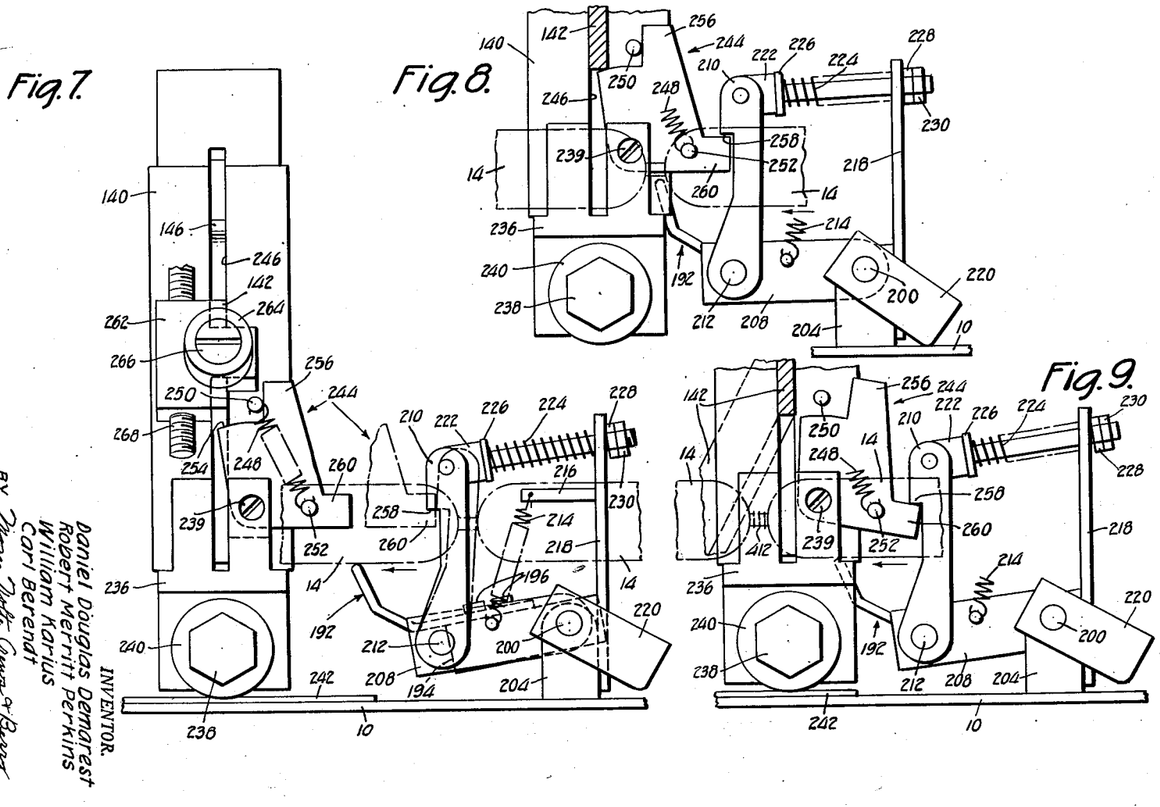
Figure 7 is a fragmentary view in side elevation showing the parts in positions which they occupy at the start of the return of the ripperhead toward its normal position.
Figure 8 is a sectional view taken upon the plane indicated by the line 8—8 of Figure 3, and looking in the direction of the arrows, but with the illustrated parts in the positions occupied when the feeler engages the ligature between frankfurters.
Figure 9 is a view similar to Figure 8 but with the parts in the positions occupied at the initiation of a ripperhead cycle.

The feeler 192 is a slotted plate having an upturned free end (Figs. 3 and 7). It is adjustably attached to a rocking arm 194 by headed screws 196 whose shanks are passed downward through a slot 198 of the feeler plate 192 and are threaded into the arm 194. The arm 194 is made fast upon a rock shaft 200. The rock shaft 200 is supported for rocking movement in bearing posts 204 which form parts of a supporting plate 206. The plate 206 is affixed to the upper side of the table 10. The rock shaft 200 also has fast upon it an arm 208 which extends substantially parallel to the arm 194 and which supports a notched actuating link 210 through a pivot pin 212. A tension coil spring 214, connected at its lower end to the arm 208 and at its upper end to an arm 216 of an upright 218 (carried by one of the posts 204), urges the rock shaft 200 and all the parts supported by it, including the feeler 192, in a clockwise direction (as the parts are viewed in Figs. 7 to 9). A stop arm 220, fast on the rock shaft 200, is engageable with the table 10 to limit clockwise rotation of the rock shaft, and hence to limit upward movement of the feeler 192 and link 210.

A shouldered rod 222 is pivotally connected to the upper end of the notched actuating link 210 and extends through the upper end of the upright 218. A compression coil spring 224 surrounds the smaller diameter portion of the rod 222, bearing at one end against the shoulder 226 and at the other against the upright 218, and serves to urge the link 210 toward the left. Leftward movement of the link 210, in Fig. 7, is limited by a stop nut 228, backed up by a lock nut 230, which nuts are adjustably threaded onto the right hand extremity of the rod 220.

Figures 7, 8 and 9 illustrate a normal sequence of operations which involves the initiation of a ripper-head cycle. Fig. 7 shows the parts as the ripperhead, after completing a forward stroke, returns toward its normal, idle position. The lower jaw has at its outer end a block 236. This block supports, through a pivot screw 238, a roller 240 which runs upon a wear plate 242. A screw 239 serves as a pivotal support for a latch 244.

The latch 244 has a shouldered portion which normally extends part way across a guideway 246 of the guide 140. A tension coil spring 248, connected to a pin 250 on the guide 140 and to a pin 252 on a tail portion of the latch 244, urges the latch counterclockwise to the position illustrated in Fig. 7 with the shoulder 254 extending part way across the guideway 246, and with an upward abutment extension 256 engaging the pin 250. The latch 244 can be cammed aside by the upper jaw 142 as the jaw moves upward, but is snapped over to the position shown in Fig. 7 as soon as the jaw 142, in its upward movement, clears the latch. When so positioned, it positively holds the jaw 142 in a raised position, keeping it out of engagement with the frankfurter string 14.

As the ripperhead returns toward the right (as seen in Fig. 7) the latch 244 is carried to the dotted line position 244a which is indicated fragmentarily. When it reaches the position 244a the feeler 192 will ordinarily stand in the same depressed position in which it is shown in Figure 7. The notch 258 of the link 210 is, therefore, at too low a level to receive the tail 260 of the latch 244, and the link 210 is therefore pushed toward the right by the tail 260, increasing the compression of the spring 224. In this position the ripperhead comes to rest.

As the frankfurter string continues to be fed toward the left, a ligature between successive links comes opposite the feeler so that the feeler, impelled by the spring 214, rises to the position illustrated in Fig. 8. The actuating link 210 is thus raised to the level shown in Fig.

8, in which it is capable of receiving the tail 260 of the latch 244 in the notch 258. As soon as the notch 258 is free to receive the tail 260, the link is snapped toward the left by the spring 224 to latch over the tail as illustrated in Fig. 8.

As the frankfurter string continues to move leftward, the feeler 192 is again depressed by the leading end of the following frankfurter as shown in Fig. 9. This causes the actuating link 210 to be pulled down and to pull the tail 260 of the latch 244 down with it. The latch shoulder 254 is swung clear of the guideway 246 and the upper jaw 142 of the ripperhead is caused to descend.

As the upper jaw 142 descends it acts through tripping mechanism to trip the rod 184 for initiating a ripperhead cycle, and for actuating a hold-down mechanism through which the jaw 142 itself is held down in clamping relation to the ligature between the links.

The jaw 142 carries at its forward end a block 262 by which a hold-down roller 264 is supported through a pivot screw 266. The block 262 also has the shank of a knurled screw 268 threaded through it. The screw constitutes an adjustable means for actuating the tripper at the precise instant desired. The tripper comprises a lever 270 (Figs. 3 and 6) and a notched supporting shaft 272 upon which the lever is made fast. The notched portion of the shaft 272 lies opposite a notch 273 in the rod 184. The lever 270 is normally held up by a spring 274, the spring being connected at its lower end to the lever 274 and at its upper end to a pin 276 which is affixed to an upstanding portion 278 of a block 280. The shaft 272 is rotatively mounted in a base portion of the block 280.

So long as the lever 270 is held up by the spring 274 the shaft 272, fitting into the notch 273 of the rod 184, holds the rod up in the position illustrated in Fig. 1, but when the lever 270 is depressed by the screw 268 the shaft 272 is rocked to a releasing position, and permits the rod 184 to be driven downward by the spring 186. The rod 184 carries at its upper end a pair of guide rollers 282 (Figs. 1 and 6) and a pair of actuating rollers 284 (one shown in Fig. 1) for operating a hold-down cam 286. As the rod 184 descends, the rollers 284 engage an inclined plate 288 which forms part of the hold-down cam 286 to rock the main body of the cam down about supporting pivot pins 290 into a horizontal attitude. The cam 286 is normally held up by a tension spring 292 (Fig. 3) which is connected to the cam at a point below the axis of the pivot pins 290 and to a stationary pin 294.

When the cam 286 is swung downward it cams aside a hold-down latch 296 and is caught by the latch and detained against returning to its raised position. The latch comprises an arm 298 pivotally mounted at 299 on a block 300 and held normally against an abutment portion 302 of the block by a spring 304. The latch includes a keeper bar 306 which is yieldingly held to the upper face of the arm 298. The keeper bar is fitted onto a jig pin 308 of the arm 298. A headed screw 310 has its shank pass freely through the keeper bar and threaded into the arm 298. A compression coil spring 312 is interposed between the upper face of the keeper bar and the head of the screw.

The cam 286 includes a flange 287 (Fig. 6) at the end remote from its fulcrum, and it is this flange which is provided with a cam surface to overlie and engage the roller 264 for holding the upper jaw 142 down. The cam surface includes an inclined portion 313 which overlies the roller when the cam is first swung down. As the ripperhead travels forward, the inclined portion 313 of the cam forces the roller down until it has been depressed to the required level. A horizontal portion 315 of the cam surface then retains the roller in this depressed position throughout the remainder of the forward stroke of the ripperhead. At the conclusion of the forward stroke of the ripperhead the roller 264 strikes the latch arm 298, swinging the latch 296 clear of the hold-down cam so that the cam can be restored to its normal, raised position by the spring 292.

During the forward stroke of the ripperhead the slide bar 146 has been forced outward to its extreme outward limit of movement, and this has served to stretch a spring 314, which is connected at one end to the slide bar 146 and at the other end to an upstanding arm 316 of the lower jaw 136. The spring is not in a loaded condition when the parts are in the positions shown in Fig. 1. It becomes loaded, however, as the slide bar 146 is advanced on the upper jaw 142. As soon as the roller 264 is released, therefore, the spring 314 acting through the slide bar 146, swings the upper jaw 142 to a raised position above the string of frankfurters and above that in which it is shown in Fig. 1. This immediately withdraws the screw 268 from engagement with the lever 270, permitting the lever to be swung upward by the spring 274 and to turn the shaft 272 into position to lock the rod 184 in raised position. The rod 184 is in raised position at the conclusion of the forward stroke of the ripperhead, having been raised by the arm 176 acting through the arm 178. Detaining of the rod 184 in raised position also detains the bell crank 180 with the arm 178 in raised position, and with the nose 181 in position to disable the clutch at the end of the cycle.

The ripperhead cycle and the ripperhead parts are desirably the same as in Patent No. 2,701,385. The description will, therefore, be made brief and reference may be had to Patent No. 2,701,385 for a more complete showing, description and explanation.

The ripperhead comprises a severing blade 326 (Fig. 4), which is removably supported in fixed position upon a rockable, generally triangular carrier plate 330, the plate 330 being pivoted on a headed stud 331 secured to the upper jaw 142. The blade 326 has a keyhole slot connection with a headed pin 334 on the plate 330 and receives a pin 336 in a hole which is formed in the blade. As the slide bar 146 moves forward, actuating mechanism 344 mounted on the slide bar 146 engages the plate 330, and rocks it to actuate the severing blade. When the leading frankfurter has been cut from the string by the severing blade, the plate 330 is rocked clear of the actuating mechanism and is returned by a spring (not shown) to its original position relative to the upper jaw 142. The actuating mechanism 344 comprises a pivoted pawl 346, urged downward by a spring 355. The pawl is constructed to actuate the plate 330 as it moves forward, but to be cammed aside by the plate as the slide bar 146 returns to its normal position.

The ripperhead also comprises a ripper blade 362 (Figs 1 and 4) which is supported upon a rockably mounted plate 364, the plate being pivotally carried upon the slide bar 146 by a headed stud 365. The blade 362, like the blade 326, is a flexible resilient blade, and like the blade 326 it is demountably secured to its mounting plate through a headed pin 366 which cooperates with a keyhole slot formed in the blade, and a jig pin 370 which is received in a hole formed in the blade.

The normal position of the plate 364 relative to the slide bar 146 is illustrated in Fig. 1. A tension coil spring 372, connected to the plate 364 and to a bracket 374 fast on the slide bar 146, urges the plate 364 in a counterclockwise direction, maintaining a projection 376 of the plate 364 in engagement with a fixed abutment 378 upon the slide bar.

The upper jaw 142 and the slide bar 146 are illustrated in Fig. 1 in raised position. When they have been lowered and clamped down, however, a pin 380 on the plate 364 is lowered into line with a stationary pin 382 which is carried on a bracket 384. The bracket 384 is made fast upon the vertical guide 140. As the slide bar 146 moves outward along the upper jaw 142, the pin 382 stands in the way of the pin 380, and this causes the plate 364 to be rocked about the pivot stud 365. The ripper blade 362 is made to travel across, and to cut partly through, the skin on the nose of the frankfurter at the side of the ripperhead which is approached by the frankfurters. As the cutting is completed the pin 380 moves clear of pin 382, and the plate 364 is snapped by the spring 372 back to its normal position relative to the slide bar.

At the conclusion of the outward movement of the slide bar a pusher bar 388, fixed on the slide bar, pushes against the frankfurter with the ligature still clamped, to extend the tear which has been started by the ripper blade and thereby form a tab upon which the peeling mechanism can act effectively.

The lower jaw 136 has affixed to it a channel member 390 (Figs. 1 and 4) one wall of which is notched to provide a guide for the frankfurters.

Figures 4, 5, 6:
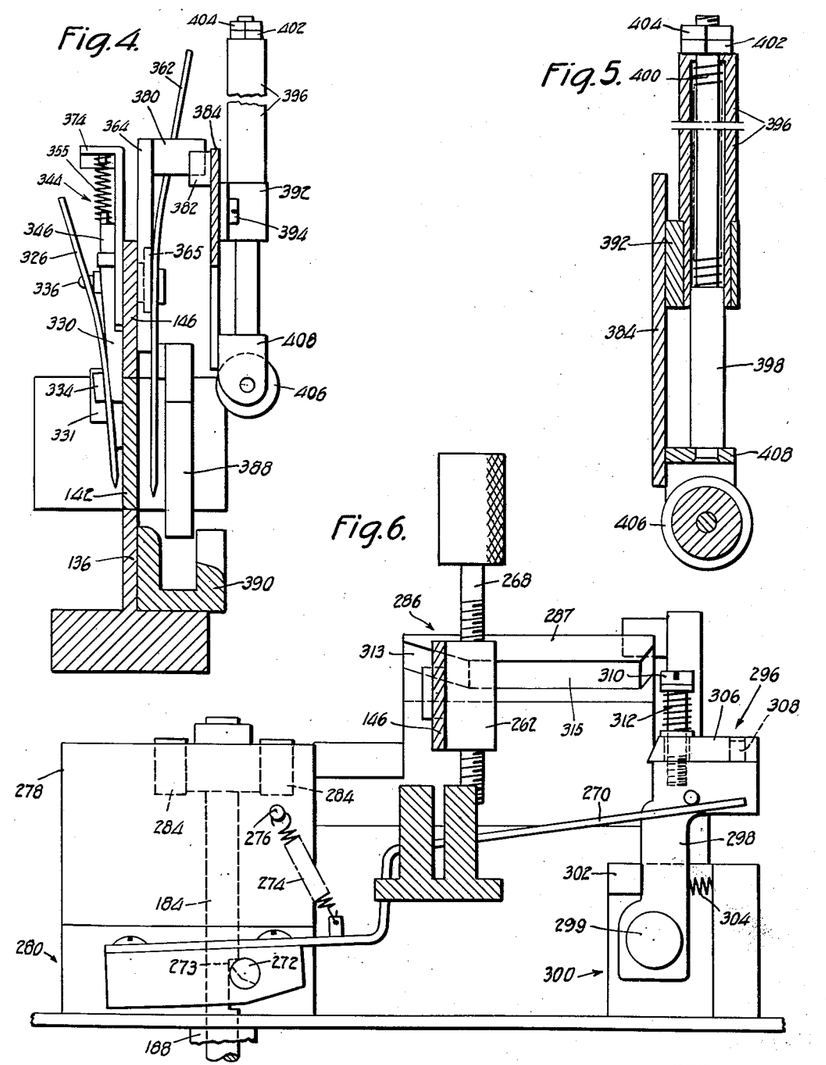
Figure 4 is a sectional view taken upon the line 4—4 of Figure 1, looking in the direction of the arrows.
Figure 5 is a sectional view taken upon the line 5—5 of Figure 1, looking in the direction of the arrows, the illustrated mechanism being broken away intermediate its ends for compactness of illustration.
Figure 6 is a fragmentary sectional view taken upon the line 6—6 of Figure 1, looking in the direction of the arrows.

The bracket 384 has a flanged mounting sleeve 392 affixed to it by screws 394. A shouldered sleeve 396 has its lower reduced end secured in the sleeve 392 (Fig. 5). A rod 398 is slidably supported in the sleeve 396, the rod having a long upper end portion of reduced diameter. A compression coil spring 400 surrounds the reduced portion of the rod 398 within the sleeve 396, bearing at its upper end against an inturned flange of the sleeve and at its lower end against the shoulder of the rod. Abutment and lock nuts 402 and 404 are adjustably threaded onto the upper extremity of the rod 398 for limiting downward movement of the rod to a desired level. At its lower end the rod 398 supports a hold-down roller 406 through a yoke 408 and a pivot pin 410. The roller 406 normally bears yieldingly against the upper side of a frankfurter in opposition to the feeler 192. It serves thus to oppose upward yielding of the frankfurter which might otherwise cause the action of the feeler and the control exerted by the feeler to be erratic.

A salient advantage of the improved construction of the present machine resides in the fact that the feeler may be timed to cause the upper and lower jaws to clamp the ligature between frankfurters immediately adjacent the leading frankfurter rather than at a distance back from the leading frankfurter. It is possible to cause the ripperhead cycle to be started just as the leading frankfurter clears the upper jaw. This causes the severing blade to cut the leading frankfurter loose from the string of frankfurters at the extreme forward end of the ligature, so that the entire ligature is left attached to the following frankfurter.

Every ligature is wrapped by a piece of the string 412 (Fig. 9) although some of the strings have been omitted in the drawing to avoid confusion. These tie strings were sometimes cut through in the prior machines. When that occurred, pieces of the string were apt to fall off and foul the mechanism. With the present arrangement the strings are not cut. Under these conditions they remain in one piece and stay with the ligature and the tab of which the ligature forms a part, so that they are dependably disposed of with the skins in orderly fashion. The previous fault is eliminated.

It will be observed that the actuation of the tripper cannot be effected until the ripperhead has completed the second half of its cycle, nor before the feeler has entered and been displaced from the space between the first two frankfurters. This is true because the latch 244 positively holds the upper jaw in raised position until after the tail 260 of the latch has been pressed against the link 210, which occurs only upon the return of the ripperhead to its normal position. Even then the latch cannot be withdrawn from the path of the upper jaw 142 until the link 210 has been raised to engage over the tail 260 and then again depressed.

It will also be observed that when the end of a frankfurter string is reached the condition of Fig. 8 will be attained, but the condition of Fig. 9 will not follow because there is no following frankfurter to again depress the feeler. The condition of the parts illustrated in Fig. 8 will, therefore, be maintained until a fresh string of frankfurters is introduced. The hold-down roller 406 is especially important at the introduction of a fresh string of frankfurters because the leading end of the leading frankfurter is exceptionally free to yield, not being connected to a frankfurter in advance of itself.

A still further important advantage of the present arrangement is that the upper jaw does not ride the frankfurter string nor engage it where there is any stuffing in the skin. There is no danger of injury, therefore, when the upper jaw drops down. Neither is there any interference of the upper and lower jaws with the normal feeding. Softer frankfurters can be more successfully handled in the present machine than in the former ones.

The addition of the hold-down roller 51 has important advantages. This fact is readily evident when comparative tests are made with and without the roller. The reason is somewhat elusive, however, and therefore the following detailed analysis is submitted in explanation.

Looked at from the introductory end of the machine:

1. At the instant of release of a ligature by the ripperhead clamp, (a) The part of the leading frankfurter of the string which extends from 58, 60 forward is free from all twisting strain and can straighten out. If the frankfurters had parallel longitudinal lines marked on them, these lines would extend straight forward from the rollers 58, 60, forming neither right hand nor left hand spirals.

(b) The part from 51 to 58, 60 has a strong right hand twist, being clamped at one end between the turning rollers 58, 60 and at the other by the straight hold-down roller 51. The hypothetical marking lines would form right hand spirals.

(c) The part in back of 51 is free from twist. The marking lines would be straight. This is always true.

2. As the leading frankfurter is seized by straight rollers 62, 64, and advanced by them, (a) The marking lines would initially extend straight from 58, 60 to 62, 64, then a left hand twist would start to develop, in the leading end of the leading frankfurter of the string, the marking lines forming slightly left hand spirals.

(b) Between the rollers 51 and the rollers 58, 60, the ligature between the first and second frankfurters will have passed the roller 51. When this occurs, the total amount of twist between 51 and 58, 60 is not affected, but the twist becomes largely concentrated in the ligature and in the link ends immediately adjacent thereto, so that the marking lines on the trailing end of the first frankfurter would partially straighten out, and the marking lines on the leading end of the second frankfurter would assume only a slightly right hand spiral form.

3. As the ligature between the first and second frankfurter passes the rollers 58, 60, (a) The right hand twist in the ligature substantially neutralizes, or more than neutralizes, the left hand twist in the leading frankfurter.

(b) There is still comparatively little twist along the body of the second frankfurter between 58, 60 and 51 because of the concentration of the twist in the ligature up to the instant when the ligature passed 58—60. As the operation continues, the right hand twist in the body of the second frankfurter builds up.

4. As the ligature is clamped, (a) There is virtually no twist in the clamped ligature. It has been loosened from the stuffing by the strong right hand twist applied between 51 and 58, 60. What little twist may be present at the instant of clamping is substantially removed by the continued twisting of the frankfurter by the rollers 58, 60 while the ligature is clamped.

(b) The right hand twist between 51 and 58, 60 continues to build up while the ligature is clamped.

5. At the instant when the tab forming knife acts, (a) The clamped ligature and the adjoining frankfurter action are substantially free from twist. The skin at and adjacent the ligature has been tensioned on the stuffing by the strong right hand twist applied between 51 and 58, 60, and has then been loosened from the stuffing by the elimination of the twist. The tab forming skin is therefore readily separated from the stuffing and formed into a tab when the knife and pusher act.

The hold-down roller 51 concentrates the right hand twist between itself and rollers 58, 60. By doing so, it assures that a uniform twist will be applied to every ligature and then straightened out before the tab is formed. If the hold-down roller were not present, the frankfurter string would be turned the same amount toward the right by rollers 58, 60, but the twisting would be allowed to extend back indefinitely through the string, at times even to the end of the string. The right twist would build up slowly in the leading frankfurters of the string, and the last frankfurters would simply roll over, not receiving any twist at all.

We have described what we believe to be the best embodiments of our invention. We do not wish, however, to be confined to the embodiments shown, but what we desire to cover by Letters Patent is set forth in the appended claims.

We claim:

1. In a machine for severing frankfurters one by one from the leading end of a string of frankfurters and for skinning each frankfurter after it has been severed, in combination, a normally idle ripperhead, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, a latch detaining the jaw normally in a raised position clear of the frankfurter path, a feeler pressed against the frankfurters as they approach the ripperhead to bear against the frankfurters and the ligatures between frankfurters, and means operatively related to the feeler and the latch and responsive to an in and out sequence of movements of the feeler to withdraw the latch from jaw obstructing position so that the jaw may descend into engagement with a ligature.

2. In a machine for severing frankfurters one by one from the leading end of a string of frankfurters and for skinning each frankfurter after it has been severed, in combination, a normally idle ripper head, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, a latch detaining the jaw normally in a raised position clear of the frankfurter path, a feeler pressed against the frankfurters as they approach the ripperhead to bear against the frankfurters and the ligatures between frankfurters, means supporting the feeler with capacity for adjustment lengthwise of the frankfurter path so that the timing of the upper jaw relative to the frankfurters can be nicely adjusted, and means operatively related to the feeler and the latch and responsive to an in and out sequence of movements of the feeler to withdraw the latch from jaw obstructing position so that the jaw may descend into engagement with a predetermined part of a ligature.

3. In a machine for severing frankfurters one by one from the leading end of a string of frankfurters and for skinning each frankfurter after it has been severed, in combination, a normally idle ripperhead, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, a latch detaining the jaw normally in a raised position clear of the frankfurter path, a feeler pressed against the frankfurters as they approach the ripperhead to bear against the frankfurters and the ligatures between frankfurters, a roller located across the frankfurter path from the feeler in opposed relation to the feeler and engageable with the frankfurters opposite the feeler to resist yielding of the frankfurters to feeler pressure, and means operatively related to the feeler responsive to an in and out sequence of movements of the feeler to withdraw the latch from jaw obstructing position so that the jaw may descend into engagement with a ligature.

4. In a machine for severing frankfurters one by one from the leading end of a string of frankfurters and for skinning each frankfurter after it has been severed, in combination, a normally idle ripperhead, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, a latch detaining the jaw normally in a raised position clear of the frankfurter path, a feeler pressed against the frankfurters as they approach the ripperhead to bear against the frankfurters and the ligatures between frankfurters, and means operatively related to the feeler and the latch and responsive to an in and out sequence of movements of the feeler to withdraw the latch from jaw obstructing position, said latch being mounted on the ripperhead for movement therewith and said latch withdrawing means being mounted independently of the ripperhead and including a latch operating member engageable with the latch only when the ripperhead is in its normal position of rest, the construction and arrangement being such that the movable jaw cannot descend while a ripperhead cycle is incomplete.

5. In a machine for severing frankfurters one by one from the leading end of a string of frankfurters and for skinning each frankfurter after it has been severed, in combination, a normally idle ripperhead, means operatively related to the ripperhead for advancing the frankfurter string anlong a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsibe to descent of the jaw onto a ligature between links to lock the jaw down, and to initiate a cycle of ripperhead operations, a latch detaining the jaw normally in a raised position clear of the frankfurter path, a feeler pressed against the frankfurters as they approach the ripperhead to bear against the frankfurters and the ligatures between frankfurters, the latch being mounted on the ripperhead and movable with it, a rocking arm on which the feeler is supported, a notched link connected to said arm and movable by it as the feeler moves into and out of a ligature space, the latch having a projecting portion movable into engagement with the link as the ripperhead arrives at its normal position of rest, but not into the notch thereof, the link being shiftable in response to movement of the feeler into a ligature space to a position to receive the projection in its notch, and being shiftable in the opposite direction in response to displacement of the feeler from the ligature space by the following frankfurter, to trip the latch and thereby bring about descent of the jaw.

6. In a machine for severing frankfurters one by one from the leading end of a string of frankfurters and for skinning each frankfurter after it has been severed, in combination, a normally idle ripperhead, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, a latch detaining the jaw normally in a raised position clear of the frankfurther path, a feeler pressed against the frankfurters as they approach the ripperhead to bear against the frankfurters and the ligatures between frankfurters, the latch being mounted on the ripperhead and movable with it, a rocking arm on which the feeler is supported, a notched link connected to said arm and movable by it as the feeler moves into and out of a ligature space, a spring urging the link toward the ripperhead, the latch having a projecting portion movable into engagement with the link as the ripperhead arrives at its normal position of rest and effective to push the link before it against the force of said spring, the link being shiftable in response to movement of the feeler into a ligature space to a position to snap over the projection on the latch, and being shiftable in the opposite direction in response to displacement of the feeler from the ligature space by the following frankfurter, to trip the latch and thereby bring about descent of the jaw.

7. In a machine for severing frankfurters one by one from the leading end of a string of frankfurters and for skinning each frankfurter after it has been severed, in combination, a normally idle ripperhead, means operatively related to the ripperhead for advancing the frankfurter string along a prescribed path to and through the ripperhead, means operatively related to the ripperhead for moving the ripperhead in its entirety, first to advance it with the advancing frankfurter string and then to return it to normal position, the ripperhead comprising a vertically movable jaw, means responsive to descent of the jaw onto a ligature between links to lock the jaw down, and to initiate a cycle of ripperhead operations, means supporting the jaw normally out of engagement with the frankfurter string, a feeler engageable with the frankfurter string, and means operatively related to the feeler and the jaw and responsive to the feeler for causing descent of the jaw into a ligature space of the frankfurter string, independently of engagement of the jaw with the frankfurter string.

8. In a machine for skinning a string of sausages, in combination, a ripperhead comprising means for clamping the ligature between successive sausages, a pair of oppositely inclined feed rollers operatively related to the ripperhead and engaging opposite sides of a sausage to advance it toward the clamping means and to put it under twisting strain, tear forming means operatively related to the clamping means and to the inclined feed rollers to effect a tab forming tear in proximity to the clamping means while the ligature is clamped, and a hold down roller operatively related to the inclined rollers and located in advance of them for bearing downward against the sausage enroute to the inclined feed rollers, to restrict the applied twisting effect to a definite length of sausage.

References Cited in the file of this patent
UNITED STATES PATENTS

| | | |
|---|---|---|
| 1,445,632 | Lundell | Feb. 20, 1923 |
| 2,156,771 | Sadoff | May 2, 1939 |
| 2,424,346 | Wilcoxon | July 22, 1947 |
| 2,434,316 | Golden et al. | Jan. 13, 1948 |
| 2,463,157 | Deitrickson | Mar. 1, 1949 |
| 2,540,747 | McClure et al. | Feb. 6, 1951 |